US011407375B2

(12) United States Patent
Lee et al.

(10) Patent No.: US 11,407,375 B2
(45) Date of Patent: Aug. 9, 2022

(54) AIRBAG APPARATUS FOR VEHICLE

(71) Applicant: HYUNDAI MOBIS CO., LTD., Seoul (KR)

(72) Inventors: Seok Min Lee, Yongin-si (KR); Sang Won Hwangbo, Yongin-si (KR); Choong Ryung Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/953,864

(22) Filed: Nov. 20, 2020

(65) Prior Publication Data
US 2021/0179009 A1 Jun. 17, 2021

(30) Foreign Application Priority Data
Dec. 17, 2019 (KR) .......................... 10-2019-0169277

(51) Int. Cl.
| | |
|---|---|
| *B60R 21/2338* | (2011.01) |
| *B60R 21/207* | (2006.01) |
| *B60R 21/233* | (2006.01) |
| *B60R 21/231* | (2011.01) |
| *B60R 21/16* | (2006.01) |

(52) U.S. Cl.
CPC ........ *B60R 21/2338* (2013.01); *B60R 21/207* (2013.01); *B60R 21/233* (2013.01); *B60R 21/23138* (2013.01); *B60R 2021/161* (2013.01); *B60R 2021/23107* (2013.01);
(Continued)

(58) Field of Classification Search
CPC ...... B60R 2021/0009; B60R 2021/161; B60R 2021/23107; B60R 2021/23146; B60R 2021/23161; B60R 2021/23308; B60R 2021/23386; B60R 21/207;
(Continued)

(56) References Cited

U.S. PATENT DOCUMENTS

| | | | | |
|---|---|---|---|---|
| 5,499,840 A | * | 3/1996 | Nakano | ................ B60N 2/0705 |
| | | | | 280/730.1 |
| 5,575,497 A | * | 11/1996 | Suyama | ................ B60R 21/231 |
| | | | | 280/730.1 |

(Continued)

FOREIGN PATENT DOCUMENTS

| | | |
|---|---|---|
| JP | 2007-084014 | 4/2007 |
| JP | 2018171993 A * | 11/2018 |

(Continued)

*Primary Examiner* — Laura Freedman
(74) *Attorney, Agent, or Firm* — H.C. Park & Associates, PLC

(57) ABSTRACT

An airbag apparatus for a vehicle includes: an airbag cushion including: a main panel; a main portion including a first sewn part joined to the main panel and a first chamber part, the main portion disposed in a side of a passenger when the airbag cushion is expanded by gas injected in the first sewn part; and an auxiliary portion including a second sewn part and a second chamber part, the auxiliary portion disposed in front of the passenger when the airbag cushion is expanded by gas injected in the second sewn part; and a connection member including a first end connected to the main portion of the airbag cushion and a second end fixed to the second sewn part of the auxiliary portion, the connection member being configured to guide the airbag cushion to be expanded in a shape of surrounding the passenger when the airbag cushion is expanded.

10 Claims, 9 Drawing Sheets

(52) U.S. Cl.
CPC .............. *B60R 2021/23146* (2013.01); *B60R 2021/23161* (2013.01); *B60R 2021/23386* (2013.01)

(58) Field of Classification Search
CPC ............ B60R 21/23138; B60R 21/232; B60R 21/233; B60R 21/2338
See application file for complete search history.

(56) References Cited

U.S. PATENT DOCUMENTS

| | | | | |
|---|---|---|---|---|
| 7,549,672 | B2 * | 6/2009 | Sato | B60R 21/207 280/729 |
| 7,997,615 | B2 * | 8/2011 | Jang | B60R 21/2338 280/743.1 |
| 9,016,718 | B2 * | 4/2015 | Fukawatase | B60R 21/23138 280/730.2 |
| 9,272,682 | B2 * | 3/2016 | Wang | B60R 21/232 |
| 9,707,922 | B2 * | 7/2017 | Wiik | B60R 21/2346 |
| 9,738,243 | B2 * | 8/2017 | Fukawatase | B60R 21/2338 |
| 9,809,189 | B2 * | 11/2017 | Grell | B60R 21/2334 |
| 9,981,624 | B2 * | 5/2018 | Perlo | B60R 21/207 |
| 9,994,181 | B1 * | 6/2018 | Dubaisi | B60R 21/207 |
| 10,023,146 | B2 * | 7/2018 | Faruque | B60R 21/233 |
| 10,065,593 | B2 * | 9/2018 | Choi | B60R 21/232 |
| 10,246,043 | B2 * | 4/2019 | Schneider | B60R 21/207 |
| 10,300,878 | B2 * | 5/2019 | Park | B60R 21/2338 |
| 10,358,106 | B2 * | 7/2019 | Sumiya | B60R 21/2165 |
| 10,471,919 | B2 * | 11/2019 | Faruque | B60R 21/205 |
| 10,501,045 | B2 * | 12/2019 | Yamada | B60R 21/2338 |
| 10,543,800 | B2 * | 1/2020 | Kwon | B60R 21/2338 |
| 10,543,801 | B2 * | 1/2020 | Kwon | B60R 21/2338 |
| 10,556,563 | B2 * | 2/2020 | Song | B60R 21/2338 |
| 10,640,076 | B2 * | 5/2020 | Lee | B60R 21/233 |
| 10,703,325 | B2 * | 7/2020 | Schneider | B60R 21/2338 |
| 10,870,405 | B2 * | 12/2020 | Kwon | B60R 21/23138 |
| 10,870,407 | B2 * | 12/2020 | Jung | B60R 21/203 |
| 10,875,486 | B2 * | 12/2020 | Kim | B60R 21/207 |
| 10,906,495 | B2 * | 2/2021 | Nagasawa | B60R 21/0132 |
| 10,926,735 | B2 * | 2/2021 | Deng | B60R 21/23138 |
| 10,933,836 | B2 * | 3/2021 | Yoo | B60N 2/79 |
| 10,960,841 | B2 * | 3/2021 | Deng | B60R 21/239 |
| 10,960,842 | B2 * | 3/2021 | Shimizu | B60R 21/213 |
| 11,066,036 | B2 * | 7/2021 | Gwon | B60R 21/231 |
| 11,091,111 | B2 * | 8/2021 | Deng | B60R 21/261 |
| 2009/0001695 | A1 * | 1/2009 | Suzuki | B60R 21/231 280/730.2 |
| 2019/0016293 | A1 * | 1/2019 | Saso | B60R 21/207 |
| 2021/0146874 | A1 * | 5/2021 | Lee | B60R 21/233 |
| 2021/0354653 | A1 * | 11/2021 | Lee | B60R 21/2338 |
| 2021/0354654 | A1 * | 11/2021 | Lee | B60R 21/233 |
| 2021/0362670 | A1 * | 11/2021 | Hwangbo | B60R 21/26 |

FOREIGN PATENT DOCUMENTS

| | | | | |
|---|---|---|---|---|
| JP | 2019137307 | A * | 8/2019 | ....... B60R 21/23138 |
| JP | 2021008206 | A * | 1/2021 | ........... B60R 21/207 |

* cited by examiner

AIRBAG APPARATUS FOR VEHICLE

CROSS REFERENCE TO RELATED APPLICATION

This application claims priority from and the benefit of Korean Patent Application No. 10-2019-0169277, filed Dec. 17, 2019, which is hereby incorporated by reference for all purposes as if fully set forth herein.

BACKGROUND

Field

Exemplary implementations of the invention relate generally to an airbag apparatus for a vehicle and more specifically, to an airbag apparatus configured to absorb impact applied to a passenger and to restrain the passenger to minimize injury of the passenger when a traffic collision occurs.

Discussion of the Background

For vehicles, technologies for ensuring safety of passengers as well as driving performance, convenience, functionality have been developed. In particular, in various safety devices applied to vehicles, an airbag is the most efficient means for protecting a passenger from impact.

The airbag is a means of protecting the driver and a passenger of a vehicle when a traffic collision occurs, and includes a collision sensor detecting a traffic collision, a controller operating the airbag according to a detected result of the collision sensor, and an airbag module operating the airbag according to a signal of the controller. The airbag is classified into a driver airbag, a passenger seat airbag, a side airbag, a roof airbag, etc., and is used on the basis of installation position and protection target.

In particular, in the case of a lateral traffic collision, upper bodies of the driver and the passenger in the passenger seat are moved, and a collision between the driver and the passenger, or injury thereof due to bumping into an armrest, a seat, etc. occurs.

In addition, when the passenger does not wear a seatbelt, the body of the passenger is excessively moved forward, and even when a front airbag is expanded, the passenger is greatly impacted or injured. Furthermore, even when the passenger wears the seatbelt, the body of the passenger is rotated due to inertia, so that secondary injury occurs.

Accordingly, a shape of the airbag is transformed and an expansion shape thereof is restrained through a tether so as to protect and restrain the passenger. In this case, gas leakage occurs through a sewn portion when the tether is sewn to an expansion portion of the airbag. In other words, when gas leaks through the sewn portion of the tether in the airbag, internal pressure of the airbag cannot be maintained, and thus the impact is not efficiently absorbed and restraint of the passenger is not efficiently performed.

The above information disclosed in this Background section is only for understanding of the background of the inventive concepts, and, therefore, it may contain information that does not constitute prior art.

SUMMARY

Applicant discovered that a typical airbag may not safely protect a passenger from being injured in a traffic collision.

Airbag apparatuses for a vehicle constructed according to the principles and exemplary implementations are capable of, when a traffic collision occurs, protecting a passenger from impact, restraining the passenger to minimize injury of the passenger, and preventing gas leakage through a sewn portion in an airbag cushion to maintain desired internal pressure of the airbag cushion.

Airbag apparatuses for a vehicle constructed according to the principles and exemplary implementations are capable of preventing gas leakage due to a sewn portion to maintain desired internal pressure of the airbag cushion, so that the passenger is efficiently protected according to initial setting of the airbag apparatus by a connection member for guiding expansion of the airbag cushion, which is connected to the airbag cushion while avoiding an area through which gas is circulated in the airbag cushion.

Additional features of the inventive concepts will be set forth in the description which follows, and in part will be apparent from the description, or may be learned by practice of the inventive concepts.

According to one aspect of the invention, an airbag apparatus for a vehicle includes: an airbag cushion including: a main panel; a main portion including a first sewn part joined to the main panel and a first chamber part, the main portion disposed in a side of a passenger when the airbag cushion is expanded by gas injected in the first sewn part; and an auxiliary portion including a second sewn part and a second chamber part, the auxiliary portion disposed in front of the passenger when the airbag cushion is expanded by gas injected in the second sewn part; and a connection member including a first end connected to the main portion of the airbag cushion and a second end fixed to the second sewn part of the auxiliary portion, the connection member being configured to guide the airbag cushion to be expanded in a shape of surrounding the passenger when the airbag cushion is expanded.

When the airbag cushion is expanded, the main portion may be disposed at the side of the passenger and is extended in a vertical direction from a head to a bottom of the passenger, and the auxiliary portion may be extended forward from the main portion to surround an upper torso of the passenger.

The airbag cushion may include a plurality of airbag cushions at opposite sides of a seatback, and auxiliary portions of the plurality of airbag cushions may be bent in a facing direction and contact each other when the airbag cushion is expanded.

The connection member may include: an auxiliary panel extended to cross the second chamber part of the auxiliary portion of the airbag cushion in a vertical direction and fixed to upper and lower ends of the second sewn part of the auxiliary portion of the airbag cushion; and a connection tether including a first end connected to the main portion of the airbag cushion and a second end connected to the auxiliary panel disposed in the auxiliary portion of the airbag cushion.

The auxiliary portion of the airbag cushion may be extended to be inclined upward from the main portion, and the connection tether may be extended to be inclined downward from the main portion to the auxiliary portion, as a connection point of the first end of the connection tether connected to the main portion is positioned higher than a connection point of the second end of the connection tether connected to the auxiliary panel.

The auxiliary panel may include a guide panel having an opening through which the connection tether passes, and the first end of the connection tether may be connected to the main portion of the airbag cushion, and the second end of the connection tether may pass through the guide panel of the auxiliary panel to be connected to an end of the second sewn part of the auxiliary portion.

The auxiliary panel may be spaced apart from an end of the auxiliary portion of the airbag cushion and may be arranged in a center portion of the auxiliary portion.

The airbag cushion may include a fixing panel extended to cross the first chamber part of the main portion and fixed to the first sewn part of the main portion, and the connection member may be connected to the main portion through the fixing panel by connecting the first end of the connection member to the fixing panel.

The first chamber part of the main portion may have a closed part through which gas is not circulated due to a joint with the main panel, and as the first end of the connection member is connected to the closed part, the connection member may be connected to the main portion through the closed part.

As the connection member may move from the first end thereof to the second end thereof, a width of the connection member is gradually increased, so that the first end of the connection member is connected to the main portion and the second end of the connection member is connected to an upper end and a lower end of the second sewn part of the auxiliary portion.

The connection member may include a first fixing tether including a first end connected to an upper end of the first sewn part of the main portion and a second end connected to an upper end of the second sewn part of the auxiliary portion, and a second fixing tether including a first end connected to a lower end of the first sewn part of the main portion and a second end connected to a lower end of the second sewn part of the auxiliary portion.

The connection member may include a first cross tether including a first end connected to an upper end of the first sewn part of the main portion and a second end connected to a lower end of the second sewn part of the auxiliary portion, and a second cross tether including a first end connected to a lower end of the first sewn part of the main portion and a second end connected to an upper end of the second sewn part of the auxiliary portion, and the first cross tether and the second cross tether are disposed to cross each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
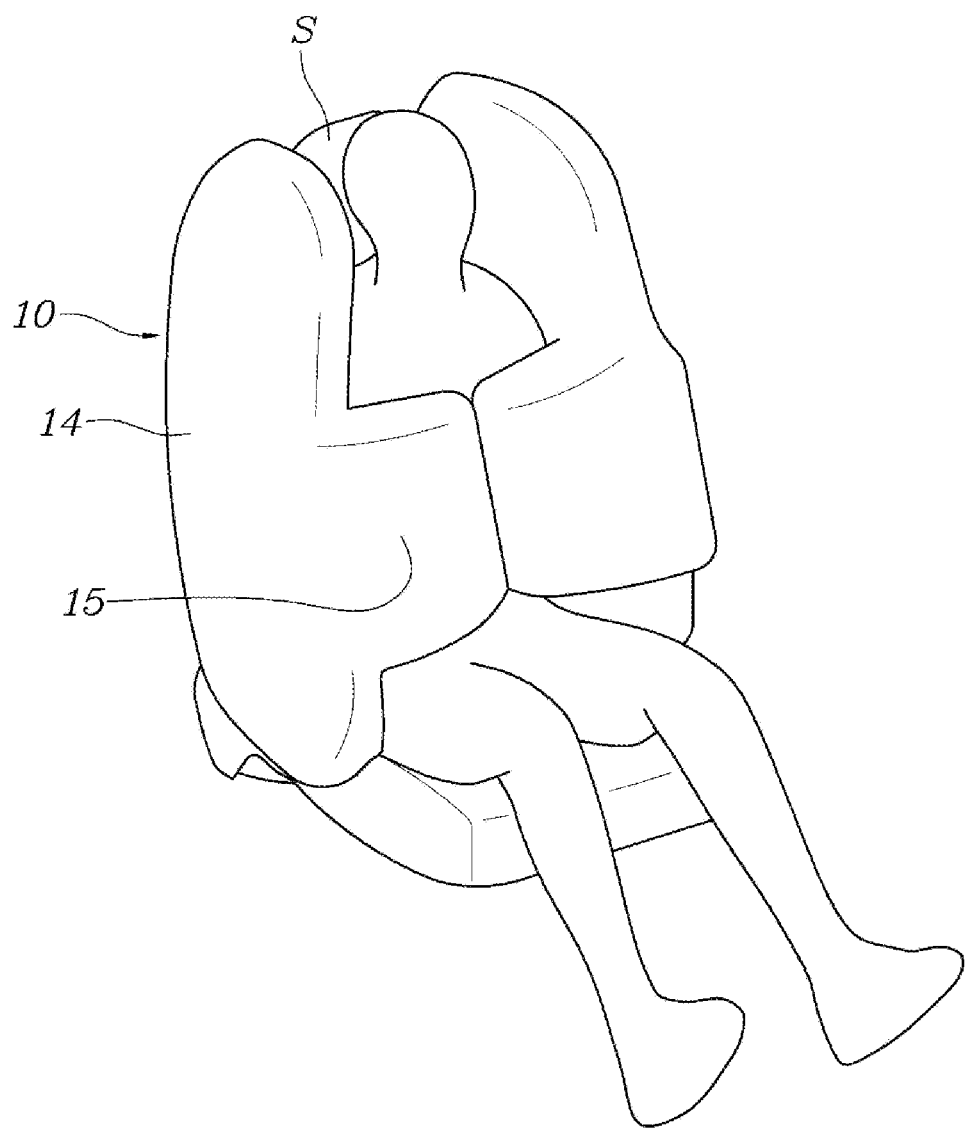
FIGS. 1 and 2 are views of an exemplary embodiment of an airbag apparatus for a vehicle constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes.

When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinbelow, an airbag apparatus for a vehicle according to exemplary embodiments of the present invention will be described with reference to the accompanying drawings.

Figure 2:
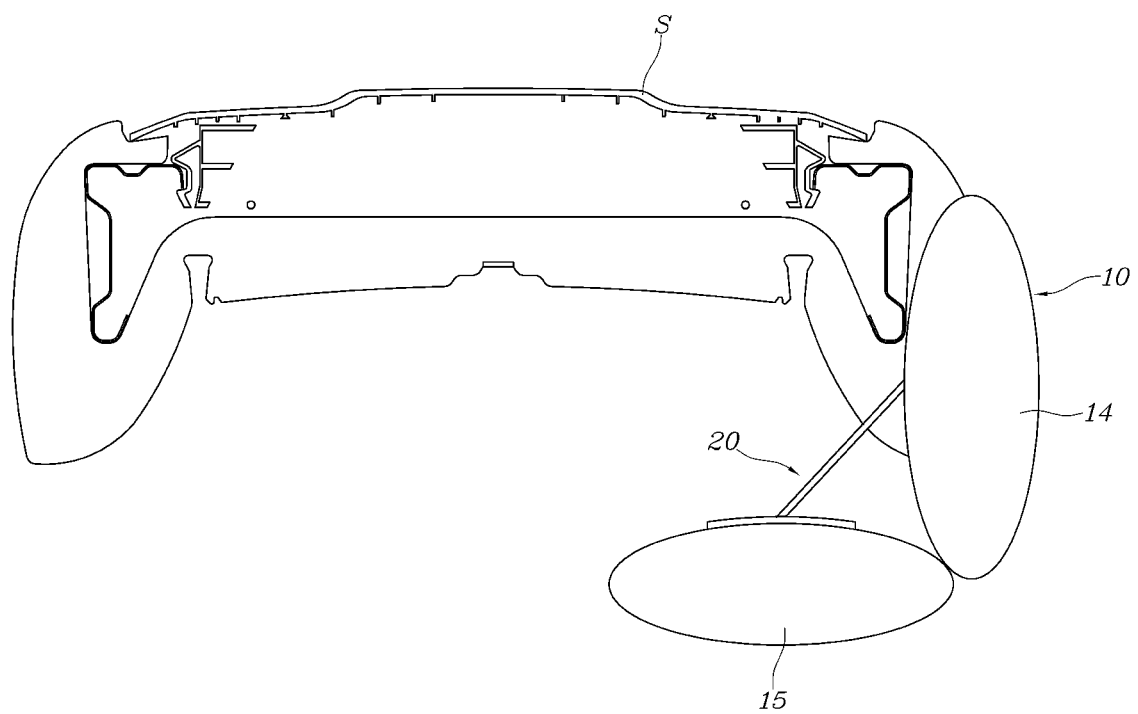
Figure 3:
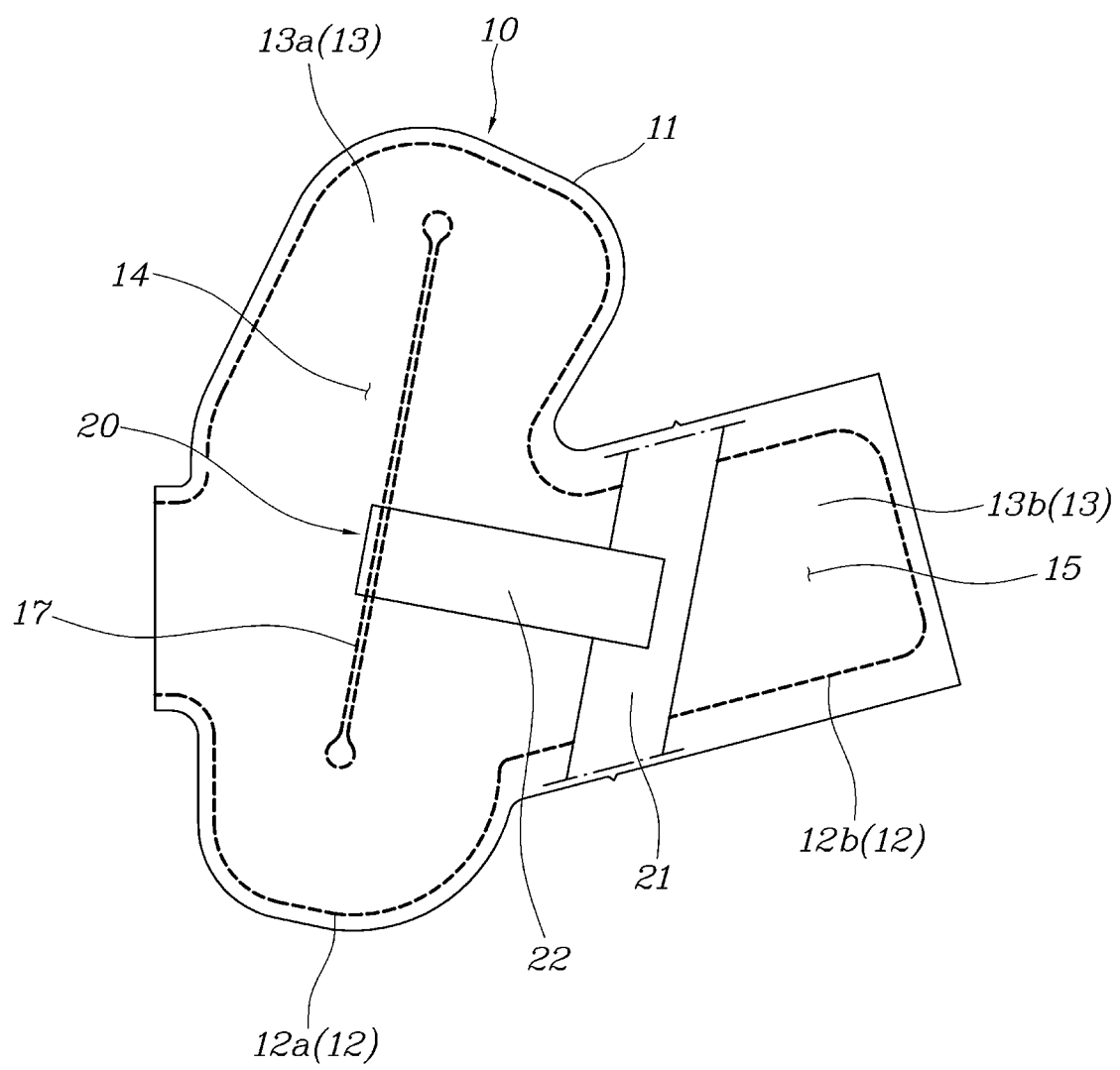
FIG. 3 is a view of a first exemplary embodiment of the airbag apparatus for the vehicle of FIG. 1.
Figure 4:
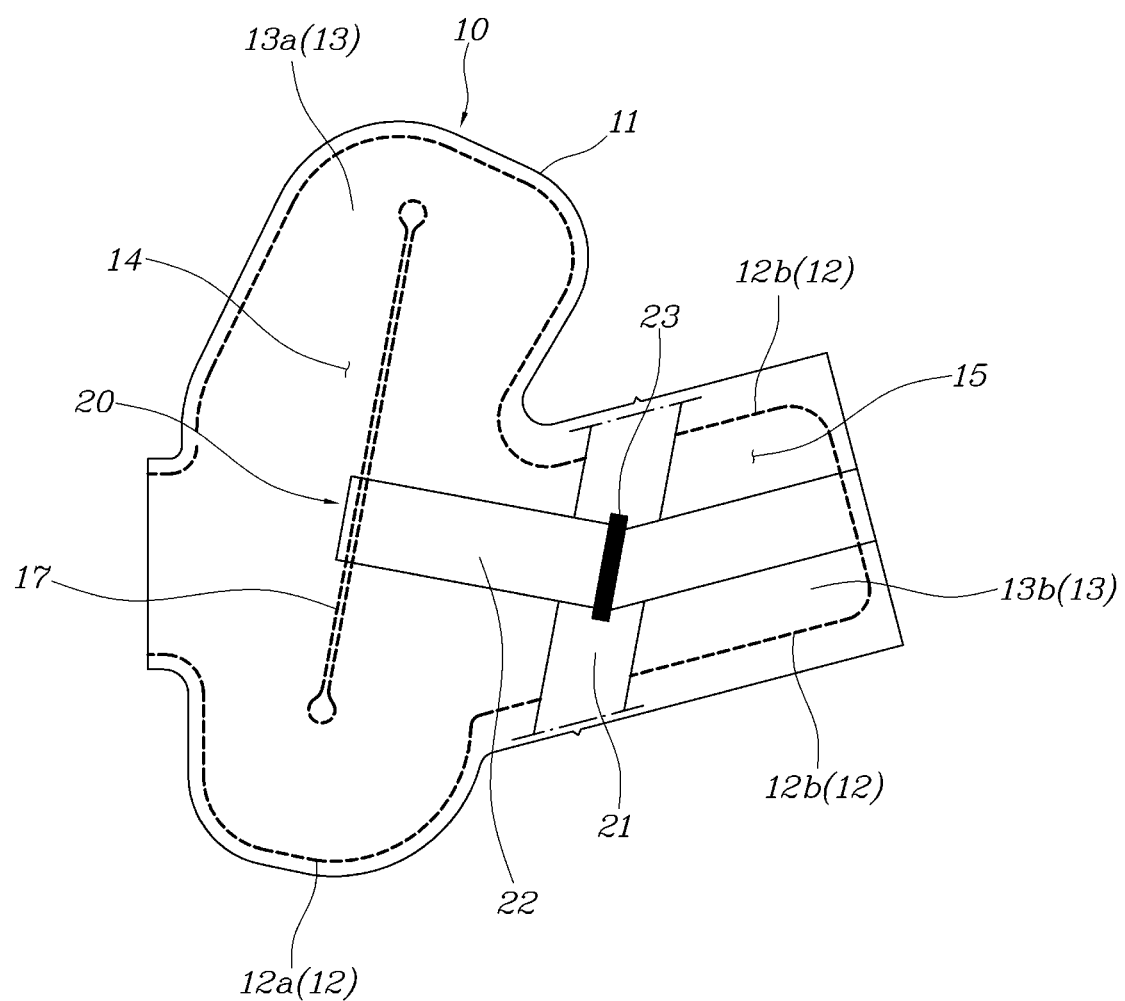
FIGS. 4 and 5 are views of a second exemplary embodiment of the airbag apparatus for the vehicle of FIG. 1.
Figure 5:
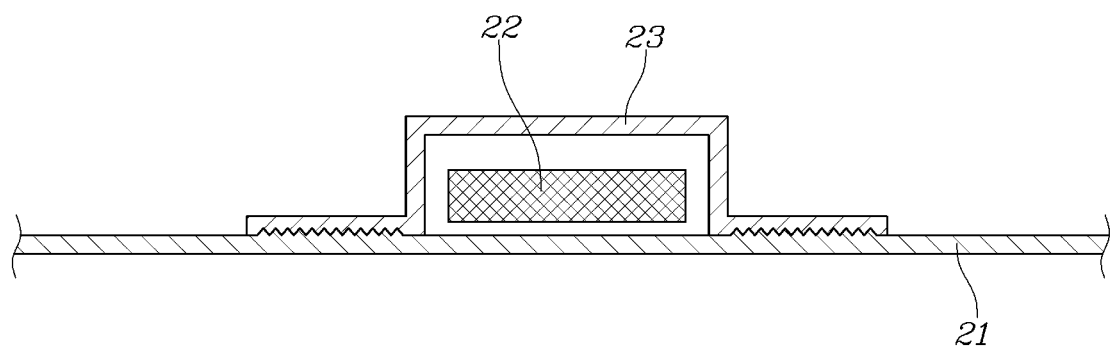
Figure 6:
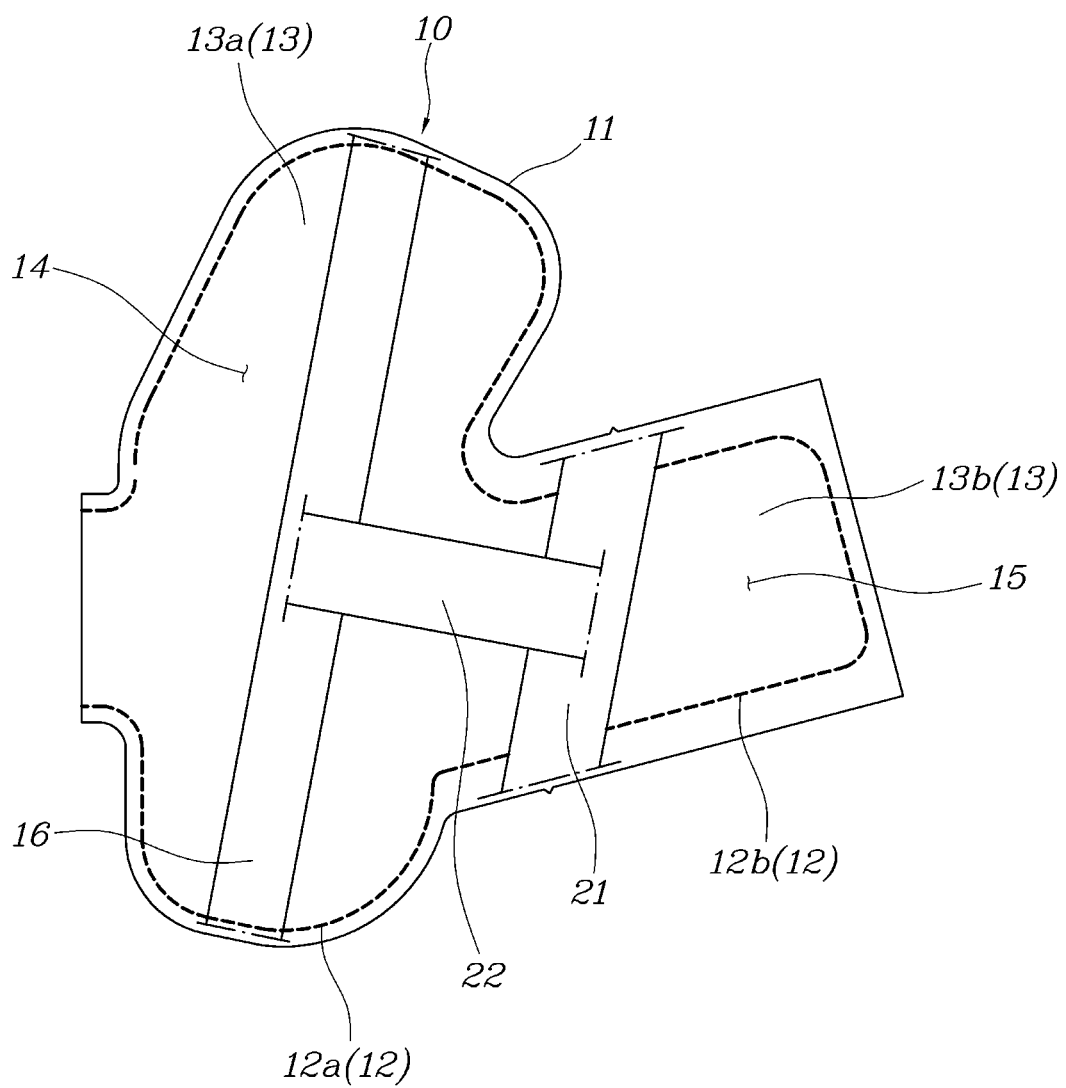
FIG. 6 is a view of a third exemplary embodiment of the airbag apparatus for the vehicle of FIG. 1.
Figure 7:
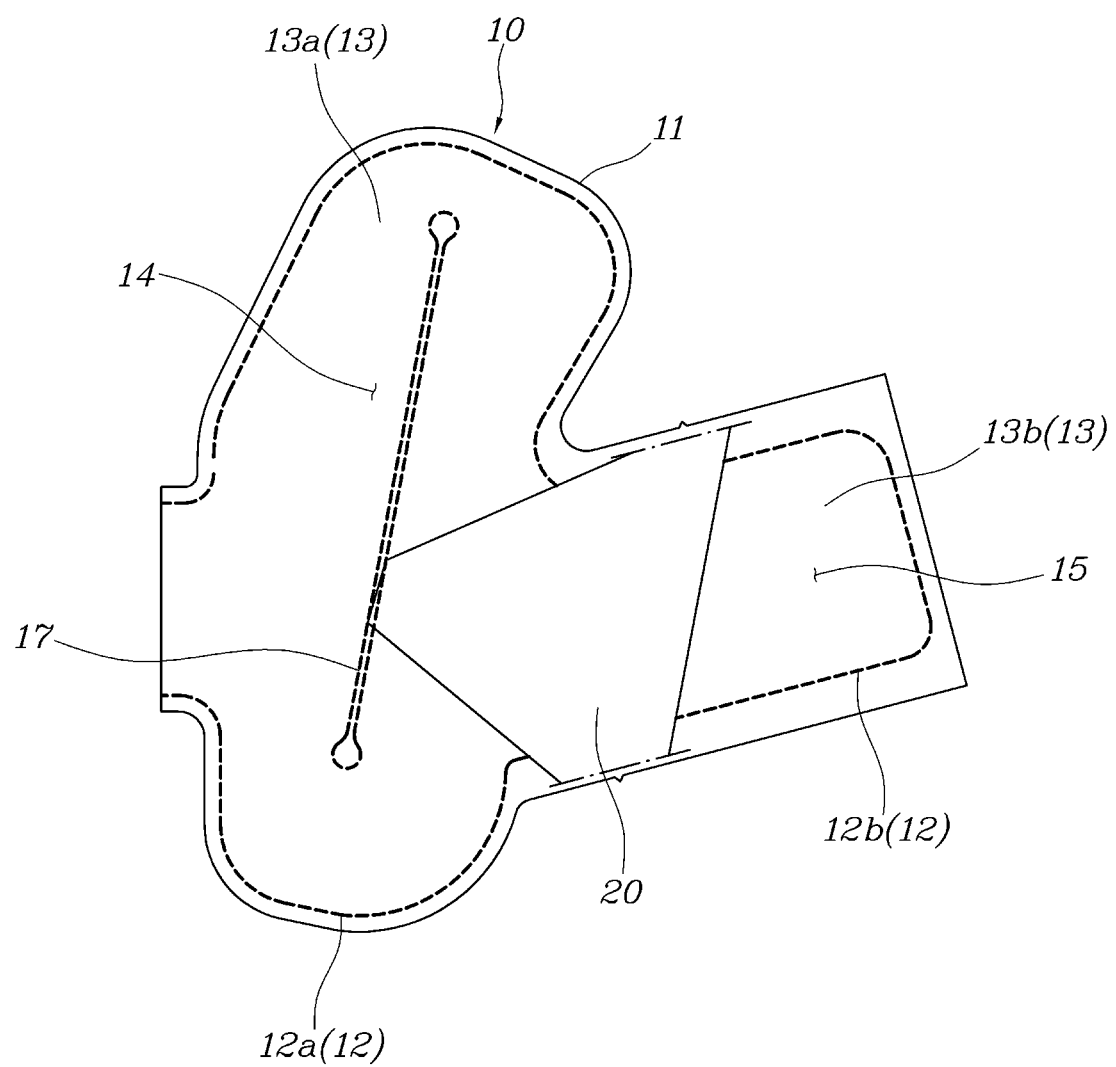
FIG. 7 is a view of a fourth exemplary embodiment of the airbag apparatus for the vehicle of FIG. 1.
Figure 8:
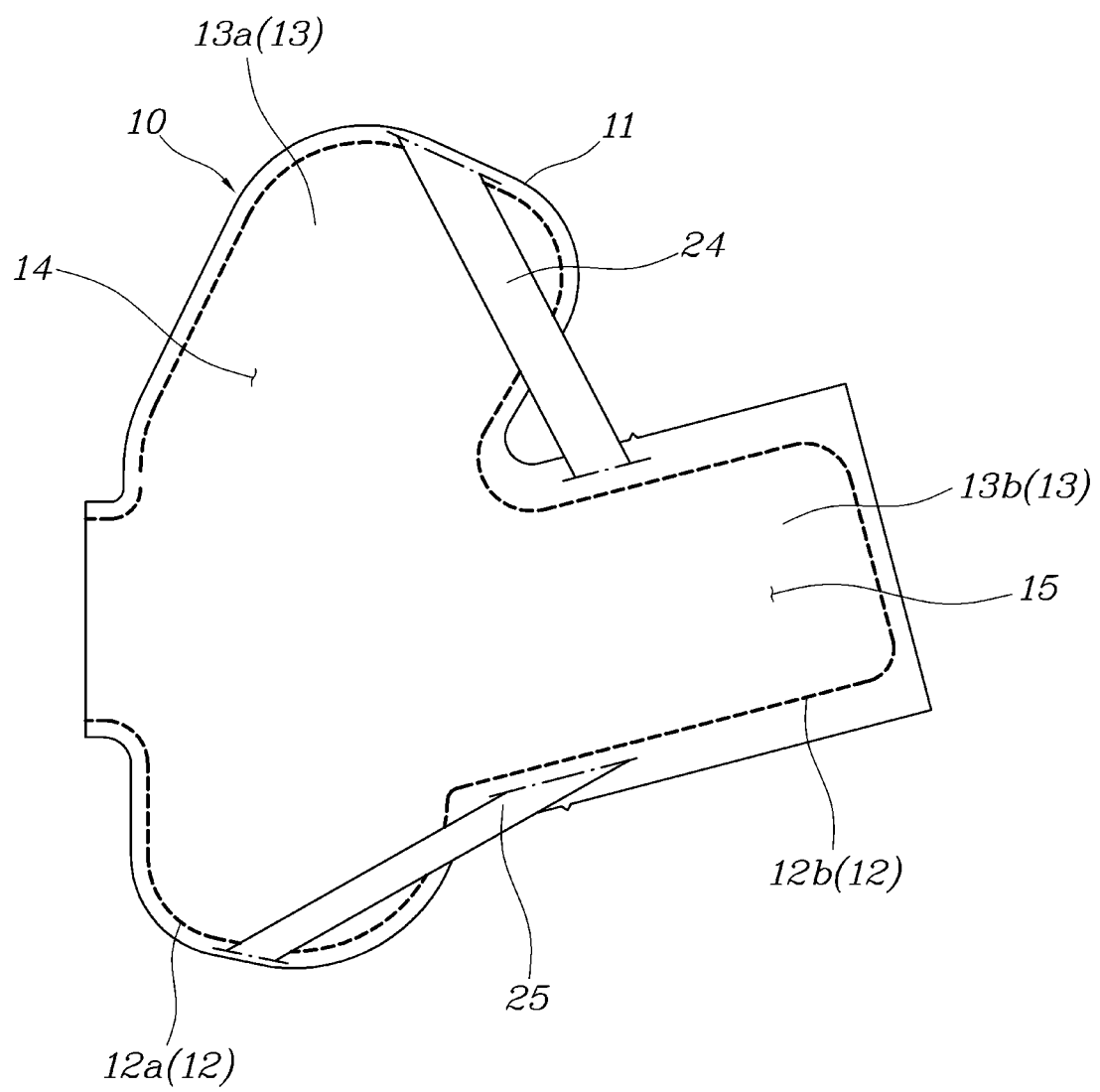
FIG. 8 is a view of a fifth exemplary embodiment of the airbag apparatus for the vehicle of FIG. 1.
Figure 9:
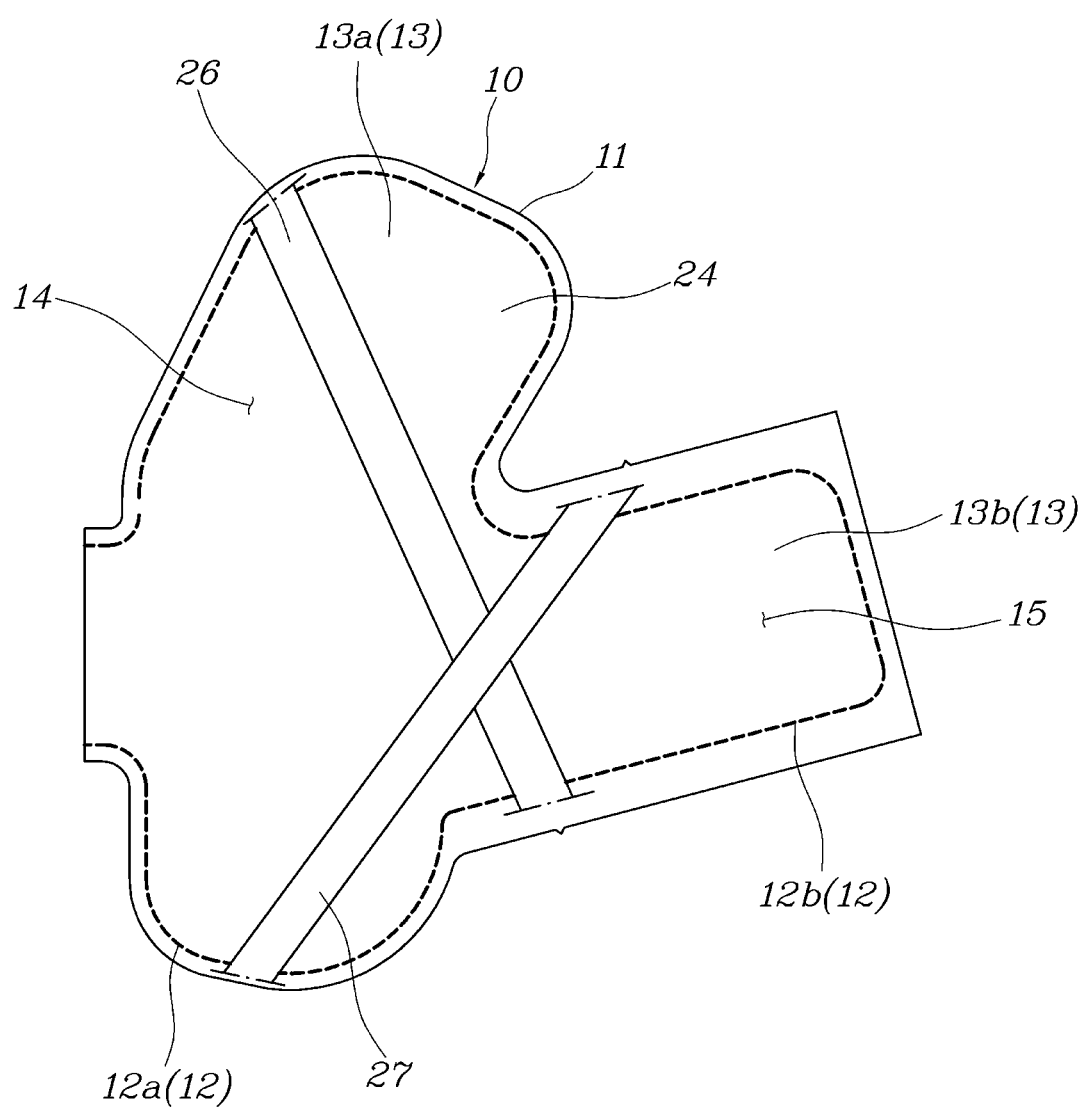
FIG. 9 is a view of a sixth exemplary embodiment of the airbag apparatus for the vehicle of FIG. 1.

FIGS. 1 and 2 are views of an exemplary embodiments of an airbag apparatus for a vehicle constructed according to the principles of the invention. FIG. 3 is a view of a first exemplary embodiment of the airbag apparatus for the vehicle of FIG. 1. FIGS. 4 and 5 are views of a second exemplary embodiment of the airbag apparatus for the vehicle of FIG. 1. FIG. 6 is a view of a third exemplary embodiment of the airbag apparatus for the vehicle of FIG. 1. FIG. 7 is a view of a fourth exemplary embodiment of the airbag apparatus for the vehicle in FIG. 1. FIG. 8 is a view of a fifth exemplary embodiment of the airbag apparatus for the vehicle in FIG. 1. FIG. 9 is a view of a sixth exemplary embodiment of the airbag apparatus for the vehicle in FIG. 1.

According to the exemplary embodiment, as shown in FIGS. 1 and 2, the airbag apparatus for a vehicle includes: an airbag cushion 10 configured to have a sewn part 12 to which a main panel 11 is joined or attached, a chamber part 13 expanded when gas is injected into the sewn part 12, a main portion 14 arranged at the side of a passenger when airbag cushion 10 is expanded by the sewn part 12 and the chamber part 13, and an auxiliary portion 15 extended forward from the main portion 14 and arranged in front of the passenger; and a connection member 20 having a first end connected to the main portion 14 of the airbag cushion 10 and a second end fixed to an auxiliary portion-side sewn part 12b (e.g., a second sewn part of the auxiliary portion 15). For example, the connection member 20 may guide the airbag cushion 10 to be unfolded in a shape of surrounding the passenger when the airbag cushion 10 is expanded.

As described above, the airbag cushion 10 is expanded when gas is injected and the connection member 20 that guides the unfolding shape of the airbag cushion 10. In the case of the airbag cushion 10, the airbag cushion 10 is configured to be expanded by being stitched with the main panel 11, and includes the sewn part 12 (e.g., a first sewn part 12a of the main portion 14) to which the main panel 11 is joined or attached and the chamber part 13 expanded when gas is injected into the sewn part 12. In other words, the airbag cushion 10 has the sewn part 12 that forms selvedge of the main panel 11 along a border of the airbag cushion 10 is not expanded, and the chamber part 13 configured to be expandable inward from the sewn part 12. Gas for expansion of the chamber part 13 is supplied from an inflator, and the inflator is commonly applied in the airbag field. The description regarding the inflator will be omitted for descriptive convenience.

In particular, when the airbag cushion 10 is expanded by the sewn part 12 and the chamber part 13, the airbag cushion 10 is configured to have the main portion 14 arranged at the side of the passenger and the auxiliary portion 15 extended forward from the main portion 14 to be arranged in front of the passenger. The main portion 14 and the auxiliary portion 15 are connected to each other through the connection member 20, whereby when the airbag cushion 10 is unfolded under situations of traffic collision, the auxiliary portion 15 is pulled by the connection member 20 and is transformed to surround the passenger.

In detail, when the airbag cushion 10 is expanded, the main portion 14 may be arranged in the side of the passenger and may be extended in a vertical direction to correspond from a head to a bottom of the passenger, and the auxiliary portion 15 may be extended forward from the main portion 14 to surround an upper torso of the passenger.

Whereby, in a traffic collision situation, the main portion 14 of the airbag cushion 10 is arranged in the side of the passenger, so that the passenger is protected from impact from the head to the bottom and is restrained due to limited movement to the side. In the front of the passenger, since the auxiliary portion 15 of the airbag cushion 10 surrounds the upper torso of the passenger, the passenger is protected from a frontal impact and is prevented from being injured due to body contact caused by lifting a lower body of the passenger or lowering an upper body thereof.

Herein, the airbag cushion 10 is provided at each of opposite side portions of a seatback S, and the auxiliary portion 15 of the airbag cushion 10 at one side portion of the seatback S may be bent in a facing direction to be brought into contact with the auxiliary portion of another airbag cushion at another side portion thereof when the airbag cushion 10 is expanded. In other words, as the auxiliary portion 15 of the airbag cushion 10 is connected to the main portion 14 through the connection member 20, when the airbag cushion 10 is expanded, the auxiliary portion 15 is limited to be unfolded forward and is bent in a direction of surrounding the passenger. At this time, the auxiliary portion 15 of each airbag cushion 10 is extended so as to be brought into contact with the other auxiliary portion 15 while being bent in the facing direction, so that restraint force for the passenger is increased.

As described above, the airbag cushion 10 includes the main portion 14 and the auxiliary portion 15, and is expanded in a shape in which the auxiliary portion 15 surrounds the passenger by the connection member 20 that connects the main portion 14 to the auxiliary portion 15.

The first end of the connection member 20 is connected to the main portion 14 of the airbag cushion 10, and the second end thereof is fixed to the auxiliary portion-side sewn part 12b. In particular, the second end of the connection member 20 is connected to the auxiliary portion-side sewn part 12b, which is an expansion portion of the airbag cushion 10, while avoiding the chamber part 13.

However, when the second end of the connection member 20 is connected to the chamber part 13 of the auxiliary portion 15, gas leaks through a sewn portion by a seam. In addition, as the auxiliary portion 15 of the airbag cushion 10 is limited to be unfolded by the connection member 20 in front of the main portion 14, the auxiliary portion 15 and the connection member 20 of the airbag cushion 10 should be firmly fixed to each other. However, when the connection member 20 is sewn to the chamber part 13 of the auxiliary portion 15, the chamber part 13 may be damaged by tearing.

In the exemplary embodiment, the second end of the connection member 20 is connected to the sewn part 12 of the auxiliary portion 15. Accordingly, as sewing is performed while avoiding the chamber part 13 of the auxiliary portion 15, leakage of gas is prevented, and the connection member 20 and the auxiliary portion 15 of the airbag cushion 10 are firmly fixed to each other, thereby securing durability and expansion performance of the airbag cushion 10.

Hereinbelow, various exemplary embodiments of the connection member 20 will be described. First, an exemplary embodiment in which the second end of the connection member 20 is firmly fixed to the sewn part 12 while avoiding the chamber part 13 will be described.

As a first embodiment, the connection member 20 may include: an auxiliary panel 21 extended to cross an auxiliary portion-side chamber part 13b (e.g., a second chamber part 13b of the auxiliary portion 15) of the airbag cushion 10 in a vertical direction and fixed to an upper end and a lower end of the auxiliary portion-side sewn part 12b; and a connection tether 22 having a first end connected to the main portion 14 of the airbag cushion 10 and a second end connected to the auxiliary panel 21 provided in the auxiliary portion 15 of the airbag cushion 10.

As shown in FIG. 3, the connection member 20 may include the auxiliary panel 21 and the connection tether 22. As the auxiliary panel 21 is connected to the upper and lower ends of the auxiliary portion-side sewn part 12b, the auxiliary panel 21 is fixed while avoiding the auxiliary portion-side chamber part 13b. As the second end of the connection tether 22 is connected to the auxiliary portion 15 of the airbag cushion 10 through the auxiliary panel 21, the connection tether 22 avoids a seam of the chamber part 13.

Therefore, when a traffic collision occurs, a main portion-side chamber part 13a (e.g., a first chamber part 13a of the main portion 14) and the auxiliary portion-side chamber part 13b (e.g., a second chamber part 13b of the auxiliary portion 15) are expanded, and at the same time, the connection member 20 connected to the main portion 14 pulls the auxiliary portion-side chamber part 13b together with the auxiliary panel 21. Thus, the auxiliary portion 15 of the airbag cushion may be transformed in a curved shape to surround the passenger. Herein, the auxiliary panel 21 is formed to have a section having a predetermined area/size, so that the auxiliary panel 21 may be firmly fixed to the auxiliary portion-side sewn part 12b as a fixed portion may be increased. Also, the connection tether 22 is formed to have a section having a predetermined area/size, so that a fixed portion between the main portion 14 and the auxiliary panel 21 may be increased.

In addition, the auxiliary panel 21 is spaced apart from an end of the auxiliary portion 15 of the airbag cushion 10 and is arranged in a center portion of the auxiliary portion 15. Accordingly, the auxiliary panel 21 may be firmly fixed to the upper and lower ends of the auxiliary portion-side sewn part 12b, and may allow the auxiliary portion 15 having the auxiliary panel 21 to be bent to an optimum level when the airbag cushion 10 is expanded.

For example, as a second exemplary embodiment shown in FIGS. 4 and 5, the auxiliary panel 21 has a guide panel 23 having an opening through which the connection tether 22 passes. In the second exemplary embodiment, the first end of the connection tether 22 is connected to the main portion 14 of the airbag cushion 10 and the second end of the connection tether 22 passes through the guide panel 23 of the auxiliary panel 21 to be connected to an end of the auxiliary portion-side sewn part 12b.

As described above, the connection tether 22 is configured to have the first end connected to the main portion 14 and the second end connected to the end of the auxiliary portion-side sewn part 12b. As the connection tether 22 is connected to the auxiliary portion-side sewn part 12b, while avoiding the auxiliary portion-side chamber part 13b, gas leakage is prevented, and the auxiliary portion 15 may be transformed to be bent when the airbag cushion 10 is expanded. Also, the connection tether 22 is extended to pass through the guide panel 23 provided on the auxiliary panel 21, so that the connection tether 22 is not lifted between the main portion 14 and the auxiliary portion 15 of the airbag cushion 10, and the connection tether 22 is prevented from being twisted.

Whereby, when the airbag cushion 10 is expanded, the connection tether 22 pulls the auxiliary portion 15 of the airbag cushion 10, but pulls the end of the auxiliary portion 15, so that the amount of curvedness of the auxiliary portion 15 is increased and the binding force for restraining the passenger is increased.

For example, the connection member 20 may prevent gas leakage from the main portion 14 as the first end thereof is fixed while avoiding the main portion-side chamber part 13a.

As a third exemplary embodiment shown in FIG. 6, the airbag cushion 10 includes a fixing panel 16 extended to cross the main portion-side chamber part 13a and fixed to a main portion-side sewn part 12a. The connection member 20 may be connected to the main portion 14 through the fixing panel 16 by connecting the first end of the connection member 20 to the fixing panel 16.

As described above, the fixing panel 16 is fixed, while avoiding the main portion-side chamber part 13a, by being connected to upper and lower ends of the main portion-side sewn part 12a. As the first end of the connection tether 22 is connected to the main portion 14 of the airbag cushion 10 through the fixing panel 16, the connection tether 22 is prevented from being sewn with the chamber part 13. As described above, in the airbag cushion 10, as the connection member 20 is fixed to the fixing panel 16 of the main portion 14 in a sewn manner, gas leakage from the main portion 14 may be fundamentally or substantially prevented and the first end of the connection member 20 and the main portion 14 may be firmly fixed to each other through the fixing panel 16.

Referring to FIG. 3, the main portion-side chamber part 13a has a closed part 17 through which gas is not circulated due to a joint with the main panel 11. The connection member 20 may be connected to the main portion 14 through the closed part 17 by connecting the first end of the connection member 20 to the closed part 17.

The closed part 17 is a dead zone that is formed by being joined or attached with the main panel 11, and provides a flow path of gas passing through the main portion-side chamber part 13a. In other words, gas supplied to the airbag cushion 10 flows in a vertical direction due to the closed part 17 that is extended in the vertical direction in the main portion-side chamber part 13a. Accordingly, the main portion-side chamber part 13a may be quickly expanded and excessive lateral expansion is limited.

In particular, as the first end of the connection member 20 is connected to the closed part 17, the connection member 20 is fixed while avoiding the main portion-side chamber part 13a. As described above, in the airbag cushion 10, as the connection member 20 is fixed to the closed part 17 of the main portion 14 in the sewn manner, gas leakage through the main portion 14 is fundamentally or substantially prevented, and the first end of the connection member 20 and the main portion 14 may be firmly fixed to each other through the closed part 17.

In another exemplary embodiment, the connection member 20 may be configured as an integral body, so that the main portion 14 and the auxiliary portion 15 of the airbag cushion 10 may be connected to each other. For example, referring to FIG. 7, as the connection member 20 moves from the first end thereof to the second end thereof, the width of the connection member 20 is gradually increased. Thus, the first end of the connection member 20 may be connected to the main portion 14 and the second end of the connection member 20 may be connected to the upper and lower ends of the auxiliary portion-side sewn part 12b.

Accordingly, the connection member 20 may be formed in a triangular shape or a trapezoidal shape. As the first end of the connection member 20 is connected to the main portion 14 and the second end of the connection member 20 is connected to the upper and lower ends of the auxiliary portion-side sewn part 12b, the second end of the connection member 20 may be firmly fixed while avoiding the auxiliary portion-side chamber part 13b. Herein, the first end of the connection member 20 may be fixed, while avoiding the main portion-side chamber part 13a, by connecting the first end of the connection member 20 to the fixing panel 16 or the closed part 17 that are described above.

As described above, the connection member 20 has a shape in which the width of the connection member 20 is generally increased as the connection member 20 moves from the first end thereof to the second end thereof. Thus, the stiffness of the connection member 20 may be secured or guaranteed, and the connection member 20 may be connected to the sewn part 12 while avoiding the chamber part 13 in the main portion 14 and the auxiliary portion 15.

In another exemplary embodiments, the connection member 20 may include multiple connection members for connecting the main portion 14 to the auxiliary portion 15 of the airbag cushion 10. For example, referring to FIG. 8, the connection member 20 may include a first fixing tether 24 having a first end connected to the upper end of the main portion-side sewn part 12a and a second end connected to the upper end of the auxiliary portion-side sewn part 12b, and a second fixing tether 25 having a first end connected to the lower end of the main portion-side sewn part 12a and a second end connected to the lower end of the auxiliary portion-side sewn part 12b.

As described above, the connection member 20 may include the first fixing tether 24 and the second fixing tether 25. The first fixing tether 24 is connected to the upper end of the main portion-side sewn part 12a and the upper end of the auxiliary portion-side sewn part 12b, and the second fixing tether 25 is connected to the lower end of the main portion-side sewn part 12a and the lower end of the auxiliary portion-side sewn part 12b. Thus, the connection member 20 may be firmly fixed while avoiding the chamber part 13 of the main portion 14 and the auxiliary portion 15. In addition, as the connection member 20 is configured as multiple connection members, when the airbag cushion 10 is expanded, the pulled force of the auxiliary portion 15 by the connection member 20 is increased. Further, the amount of bending of the auxiliary portion 15 is increased, a bonding force of the passenger is increased.

As described above, the connection member 20 may include the first fixing tether 24 and the second fixing tether 25. The first fixing tether 24 and the second fixing tether 25 are respectively connected to the upper ends of the sewn part 12 of the main portion 14 and the lower ends of the sewn part 12 of the auxiliary portion 15. Accordingly, gas leakage from the main portion 14 and the auxiliary portion 15 may be prevented and the first and second ends of the connection member 20 may be firmly fixed.

For example, as shown in FIG. 9, the connection member 20 may include a first cross tether 26 having a first end connected to the upper end of the main portion-side sewn part 12a and a second end connected to the lower end of the auxiliary portion-side sewn part 12b, and a second cross tether 27 having a first end connected to the lower end of the main portion-side sewn part 12a and a second end connected to the upper end of the auxiliary portion-side sewn part 12b. The first cross tether 26 and the second cross tether 27 may be arranged to cross each other.

As described above, the connection member 20 may include the first cross tether 26 and the second cross tether 27. As the first cross tether 26 and the second cross tether 27 cross each other, the upper end of the main portion-side sewn part 12a is connected to the lower end of the auxiliary portion-side sewn part 12b, and the lower end of the main portion-side sewn part 12a is connected to the upper end of the auxiliary portion-side sewn part 12b. Accordingly, the connection member 20 may be firmly fixed while avoiding the chamber part 13 in the main portion 14 and the auxiliary portion 15.

In addition, when the airbag cushion 10 is expanded, the pulled force of the auxiliary portion 15 due to the first cross tether 26 and the second cross tether 27 is increased, and as the amount of bending of the auxiliary portion 15 is increased, a bonding force of the passenger is increased. In addition, the first cross tether 26 and the second cross tether 27 are extended to cross each other, thereby supporting the vertical movement of the auxiliary portion 15. Thus, the auxiliary portion 15 of the airbag cushion 10 is positioned corresponding to the upper torso of the passenger.

As described above, the connection member 20 may include the first cross tether 26 and the second cross tether 27, and respectively connected to the upper end of the sewn part 12 at the main portion 14 and the lower end of the sewn part 12 at the auxiliary portion 15. Accordingly, gas leakage from the main portion 14 and the auxiliary portion 15 is prevented, and the first and second ends of the connection member 20 may be firmly fixed.

For example, the auxiliary portion 15 of the airbag cushion 10 is extended to be inclined upward from the main portion 14. The connection tether 22 may be extended to be inclined downward from the main portion 14 to the auxiliary portion 15, as a connection point of the first end of the connection tether 22 connected to the main portion 14 is positioned higher than a connection point of the second end of the connection tether 22 connected to the auxiliary panel 21 of the auxiliary portion 15.

As described above, as the auxiliary portion 15 is extended to be inclined upward from the main portion 14, when the airbag cushion 10 is expanded, the airbag cushion 10 is configured as a shape in which the auxiliary portion 15 surrounds the upper torso of the passenger from a lower side to an upper side of the passenger. Therefore, in the situation in which the airbag cushion 10 is expanded, the auxiliary portion 15 may firmly support the upper torso of the passenger. In addition, the connection tether 22 is extended to be inclined downward, and thus the auxiliary portion 15 extended to be inclined upward is pulled while being rotated downward, so that a bonding force of the passenger by the auxiliary portion 15 of the airbag cushion 10 is increased.

In the airbag apparatus for a vehicle having the above-described structure, the airbag cushion 10 includes the main portion 14 arranged at the side of the passenger and the auxiliary portion 15 arranged in front of the passenger, the main portion 14 and the auxiliary portion 15 are unfolded in a shape of surrounding the passenger to protect the passenger from impact, and a position of the passenger is restrained to prevent further injury. In particular, the connection member 20 for guiding expansion of the airbag cushion 10 is connected to the airbag cushion 10 while avoiding the area through which gas is circulated in the airbag cushion 10. Whereby, gas leakage due to a sewn portion is prevented to maintain desired internal pressure of the airbag cushion 10, so that the passenger is efficiently or safely protected according to initial setting of the airbag apparatus.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An airbag apparatus for a vehicle, the airbag apparatus comprising:
    an airbag cushion comprising:
        a main panel;
        a main portion comprising a first sewn part joined to the main panel and a first chamber part, the main portion configured to cover a side of a passenger when the airbag cushion is expanded by gas injected in the first sewn part; and
        an auxiliary portion comprising a second sewn part and a second chamber part, the auxiliary portion configured to cover a front of the passenger when the airbag cushion is expanded by gas injected in the second sewn part; and
    a connection member comprising a first end connected to the main portion of the airbag cushion and a second end fixed to the second sewn part of the auxiliary portion, the connection member being configured to guide the airbag cushion to be expanded in a shape surrounding the passenger when the airbag cushion is expanded,
    wherein the connection member comprises:
    an auxiliary panel extended to cross the second chamber part of the auxiliary portion of the airbag cushion in a vertical direction and fixed to upper and lower ends of the second sewn part of the auxiliary portion of the airbag cushion; and
    a connection tether comprising a first end connected to the main portion of the airbag cushion and a second end connected to the auxiliary panel disposed in the auxiliary portion of the airbag cushion.

2. The airbag apparatus of claim 1, wherein when the airbag cushion is expanded, the main portion is configured to cover the side of the passenger and to be extended in a vertical direction to cover a head and a bottom of the passenger, and the auxiliary portion is configured to extended forward from the main portion to surround an upper torso of the passenger.

3. The airbag apparatus of claim 1, wherein the airbag cushion comprises a plurality of airbag cushions at opposite sides of a seatback, and auxiliary portions of the plurality of airbag cushions are bent in a facing direction and contact each other when the airbag cushion is expanded.

4. The airbag apparatus of claim 1, wherein the auxiliary portion of the airbag cushion is extended to be inclined upward from the main portion, and
    the connection tether is extended to be inclined downward from the main portion to the auxiliary portion, as a connection point of the first end of the connection tether connected to the main portion is positioned higher than a connection point of the second end of the connection tether connected to the auxiliary panel.

5. The airbag apparatus of claim 1, wherein the auxiliary panel comprises a guide panel having an opening through which the connection tether passes, and
    the first end of the connection tether is connected to the main portion of the airbag cushion, and the second end of the connection tether passes through the guide panel of the auxiliary panel to be connected to an end of the second sewn part of the auxiliary portion.

6. The airbag apparatus of claim 1, wherein the auxiliary panel is spaced apart from an end of the auxiliary portion of the airbag cushion and is arranged in a center portion of the auxiliary portion.

7. The airbag apparatus of claim 1, wherein the first chamber part of the main portion has a closed part through which gas is not circulated due to a joint with the main panel, and as the first end of the connection member is connected to the closed part, the connection member is connected to the main portion through the closed part.

8. An airbag apparatus for a vehicle, the airbag apparatus comprising:
   an airbag cushion comprising:
      a main panel;
      a main portion comprising a first sewn part joined to the main panel and a first chamber part, the main portion configured to cover a side of a passenger when the airbag cushion is expanded by gas injected in the first sewn part; and
      an auxiliary portion comprising a second sewn part and a second chamber part, the auxiliary portion configured to cover a front of the passenger when the airbag cushion is expanded by gas injected in the second sewn part; and
   a connection member comprising a first end connected to the main portion of the airbag cushion and a second end fixed to the second sewn part of the auxiliary portion, the connection member being configured to guide the airbag cushion to be expanded in a shape surrounding the passenger when the airbag cushion is expanded, wherein the airbag cushion comprises a fixing panel extended to cross the first chamber part of the main portion and fixed to the first sewn part of the main portion, and
   the connection member is connected to the main portion through the fixing panel by connecting the first end of the connection member to the fixing panel.

9. An airbag apparatus for a vehicle, the airbag apparatus comprising:
   an airbag cushion comprising:
      a main panel;
      a main portion comprising a first sewn part joined to the main panel and a first chamber part, the main portion configured to cover a side of a passenger when the airbag cushion is expanded by gas injected in the first sewn part; and
      an auxiliary portion comprising a second sewn part and a second chamber part, the auxiliary portion configured to cover a front of the passenger when the airbag cushion is expanded by gas injected in the second sewn part; and
   a connection member comprising a first end connected to the main portion of the airbag cushion and a second end fixed to the second sewn part of the auxiliary portion, the connection member being configured to guide the airbag cushion to be expanded in a shape surrounding the passenger when the airbag cushion is expanded, wherein as the connection member moves from the first end thereof to the second end thereof, a width of the connection member is gradually increased, so that the first end of the connection member is connected to the main portion and the second end of the connection member is connected to an upper end and a lower end of the second sewn part of the auxiliary portion.

10. An airbag apparatus for a vehicle, the airbag apparatus comprising:
   an airbag cushion comprising:
      a main panel;
      a main portion comprising a first sewn part joined to the main panel and a first chamber part, the main portion configured to cover a side of a passenger when the airbag cushion is expanded by gas injected in the first sewn part; and
      an auxiliary portion comprising a second sewn part and a second chamber part, the auxiliary portion configured to cover a front of the passenger when the airbag cushion is expanded by gas injected in the second sewn part; and
   a connection member comprising a first end connected to the main portion of the airbag cushion and a second end fixed to the second sewn part of the auxiliary portion, the connection member being configured to guide the airbag cushion to be expanded in a shape surrounding the passenger when the airbag cushion is expanded, wherein the connection member comprises a first cross tether comprising a first end connected to an upper end of the first sewn part of the main portion and a second end connected to a lower end of the second sewn part of the auxiliary portion, and a second cross tether comprising a first end connected to a lower end of the first sewn part of the main portion and a second end connected to an upper end of the second sewn part of the auxiliary portion, and the first cross tether and the second cross tether are disposed to cross each other.

* * * * *